US010803295B2

(12) United States Patent
Zheng

(10) Patent No.: US 10,803,295 B2
(45) Date of Patent: Oct. 13, 2020

(54) METHOD AND DEVICE FOR FACE SELECTION, RECOGNITION AND COMPARISON

(71) Applicant: ALIBABA GROUP HOLDING LIMITED, Grand Cayman (KY)

(72) Inventor: Dandan Zheng, Beijing (CN)

(73) Assignee: ALIBABA GROUP HOLDING LIMITED, Grand Cayman (CN)

( * ) Notice: Subject to any disclaimer, the term of this patent is extended or adjusted under 35 U.S.C. 154(b) by 0 days.

(21) Appl. No.: 16/702,334

(22) Filed: Dec. 3, 2019

(65) Prior Publication Data
US 2020/0175257 A1    Jun. 4, 2020

(30) Foreign Application Priority Data

Dec. 4, 2018  (CN) .......................... 2018 1 1474564

(51) Int. Cl.
*G06K 9/00* (2006.01)
*G06T 7/70* (2017.01)
(52) U.S. Cl.
CPC ..... *G06K 9/00255* (2013.01); *G06K 9/00248* (2013.01); *G06T 7/70* (2017.01); *G06T 2207/30201* (2013.01)
(58) Field of Classification Search
None
See application file for complete search history.

(56) References Cited

U.S. PATENT DOCUMENTS

| | | | |
|---|---|---|---|
| 4,710,011 A * | 12/1987 | Ushiro | G01C 3/10 396/106 |
| 8,331,619 B2 | 12/2012 | Ikenoue | |
| 8,417,059 B2 | 4/2013 | Yamada | |
| 8,611,616 B1 | 12/2013 | Ross et al. | |
| 8,737,756 B2 | 5/2014 | Daneshpanah et al. | |
| 2005/0147278 A1 | 7/2005 | Rui et al. | |
| 2007/0098251 A1 | 5/2007 | Lu | |
| 2009/0167857 A1 | 7/2009 | Matsuda et al. | |
| 2009/0213224 A1 | 8/2009 | Zandifar et al. | |
| 2011/0222734 A1 | 9/2011 | Angot et al. | |
| 2011/0279700 A1 | 11/2011 | Steinberg et al. | |
| 2012/0033051 A1 | 2/2012 | Atanassov et al. | |

(Continued)

FOREIGN PATENT DOCUMENTS

| | | |
|---|---|---|
| CN | 100334881 C | 8/2007 |
| CN | 100424466 C | 10/2008 |

(Continued)

OTHER PUBLICATIONS

Invitation to Pay Additional Fees for PCT Application No. PCT/US2019/064302 mailed on Feb. 14, 2020.

(Continued)

*Primary Examiner* — Iman K Kholdebarin

(57) ABSTRACT

Methods, systems, and devices, including computer programs encoded on computer storage media, for selecting a target face are provided. One of the methods includes: obtaining at least one facial area including one or more faces in an image taken by a camera; determining, based on the image, a spatial distance between each of the one or more faces and the camera; and selecting, based on the spatial distance, the target face from the one or more faces.

19 Claims, 4 Drawing Sheets

(56) References Cited

U.S. PATENT DOCUMENTS

| | | | |
|---|---|---|---|
| 2013/0076625 A1* | 3/2013 | Yamashita | G06F 3/041 |
| | | | 345/157 |
| 2013/0177249 A1 | 7/2013 | Brown et al. | |
| 2015/0116353 A1 | 4/2015 | Miura et al. | |
| 2015/0278583 A1* | 10/2015 | Yokokawa | G06T 7/70 |
| | | | 345/156 |
| 2015/0302239 A1* | 10/2015 | Ohba | G06K 9/00261 |
| | | | 382/154 |
| 2015/0348269 A1* | 12/2015 | Dedhia | G06T 7/75 |
| | | | 382/197 |
| 2016/0292871 A1* | 10/2016 | Liu | H04N 5/23229 |
| 2017/0161906 A1* | 6/2017 | Davis | G06K 9/2027 |
| 2017/0302905 A1* | 10/2017 | Shteinfeld | H04N 13/204 |
| 2018/0032797 A1 | 2/2018 | Lee et al. | |
| 2018/0098727 A1* | 4/2018 | Spahn | A61B 5/01 |
| 2019/0051035 A1* | 2/2019 | Nishiyama | H04N 13/243 |
| 2019/0172426 A1* | 6/2019 | Ni | G06F 3/0304 |
| 2019/0354662 A1* | 11/2019 | Min | G06K 9/00255 |

FOREIGN PATENT DOCUMENTS

| | | |
|---|---|---|
| CN | 101916370 B | 4/2012 |
| CN | 101427266 B | 10/2012 |
| CN | 103116739 B | 11/2017 |
| CN | 108399665 A | 8/2018 |
| EP | 0865637 A1 | 9/1998 |
| EP | 2584309 A1 | 4/2013 |
| JP | 4400527 B2 | 1/2010 |
| JP | 2015162080 A | 9/2015 |
| KR | 20140000195 A | 1/2014 |
| KR | 101507662 B1 | 3/2015 |
| TW | I441095 B | 6/2014 |
| TW | I554936 B | 10/2016 |
| WO | 9721188 A1 | 6/1997 |

OTHER PUBLICATIONS

Written Opinion and Search Report for PCT Application No. PCT/US2019/064302 dated Jun. 24, 2020.

* cited by examiner

METHOD AND DEVICE FOR FACE SELECTION, RECOGNITION AND COMPARISON

CROSS-REFERENCE TO RELATED APPLICATION

This application claims priority to the Chinese patent application No. 201811474564.3, filed on Dec. 4, 2018, and entitled "Method and Device for Face Selection, Recognition and Comparison," which is incorporated herein by reference in its entirety.

TECHNICAL FIELD

The present disclosure relates to the field of computer technologies, and in particular, to a method and device for selection, recognition and comparison of a target face.

BACKGROUND

In a current offline device with face-scanning payment scenario, a facial image is scanned for comparison of biological characteristics, and a successful comparison may trigger the payment process to be further executed.

In a typical payment scenario, a plurality of people may wait in line for payment. A payment terminal may collect all facial images in a collection region with a camera, and then based on the largest facial area selection logic, select the target face from the one or more facial images for comparison with the stored facial images.

However, considering that the key technologies of selecting the largest facial area often includes relatively large errors, and that faces are generally different in size, the accuracy of selecting a target face may be not guaranteed.

SUMMARY

The objective of the present specification is to provide a method and device for selection, recognition and comparison of a target face, so as to improve the accuracy of selecting the target face.

According to a first aspect, the specification provides a method for selecting a target face from one or more faces. The method comprises: obtaining at least one facial area including one or more faces in an image taken by a camera; determining, based on the image, a spatial distance between each of the one or more faces and the camera; and selecting, based on the spatial distance, the target face from the one or more faces.

According to a second aspect, the specification provides a method for face recognition and comparison. The method comprises: obtaining at least one facial area including one or more faces in an image taken by a camera; determining, based on the image, a spatial distance between each of the one or more faces and the camera; selecting, based on the spatial distance, a target face from the one or more faces; and conducting face recognition and comparison based on the selected target face.

According to a third aspect, the specification a device for selecting a target face from one or more faces. The device includes one or more processors and one or more non-transitory computer-readable memories coupled to the one or more processors and configured with instructions executable by the one or more processors to perform operations. The operations may include: obtaining at least one facial area including one or more faces in an image taken by a camera; determining, based on the image, a spatial distance between each of the one or more faces and the camera; and selecting, based on the spatial distance, the target face from the one or more faces.

The specification further provides a non-transitory computer-readable storage medium for selecting a target face. The non-transitory computer-readable storage medium stores instructions executable by one or more processors to cause the one or more processors to perform operations. The operations may include: obtaining at least one facial area including one or more faces in an image taken by a camera; determining, based on the image, a spatial distance between each of the one or more faces and the camera; and selecting, based on the spatial distance, the target face from the one or more faces.

The specification further provides another device for selecting a target face. The device may include: an obtaining module configured to obtain at least one facial area including one or more faces in an image taken by a camera; a determining module configured to determine, based on the image, a spatial distance between each of the one or more faces and the camera; and a selecting module configured to select, based on the spatial distance, a target face from the one or more faces.

In the present specification, a target face is selected, from one or more faces based on a spatial distance between each of the one or more faces and the camera, thereby avoiding the errors caused by selecting the target face based on the facial area size, and improving the accuracy of selecting a target face. Moreover, considering that dimensions of spatial distance can be combined in any manner, the selection method can be flexibly set to improve the selection accuracy in a more reasonable and effective manner.

BRIEF DESCRIPTION OF THE DRAWINGS

To more clearly describe the technical solutions in the embodiments of the present specification or in current technologies, the accompanying drawings to be used in the description of the embodiments or current technologies will be described. The accompanying drawings in the description below are merely examples, and one of ordinary skill in the art may obtain other drawings according to the accompanying drawings without inventive effort.

DETAILED DESCRIPTION

To enable one of ordinary skill in the art to better understand the technical solutions in the present specification, the present specification will be described below with reference to the accompanying drawings. The described embodiments are merely some, but not all, embodiments of the present specification. Based on the embodiments of the present specification, all other embodiments obtainable by one of ordinary skill in the art without inventive effort shall fall within the protection scope of the present disclosure.

Embodiment I

Figure 1A:
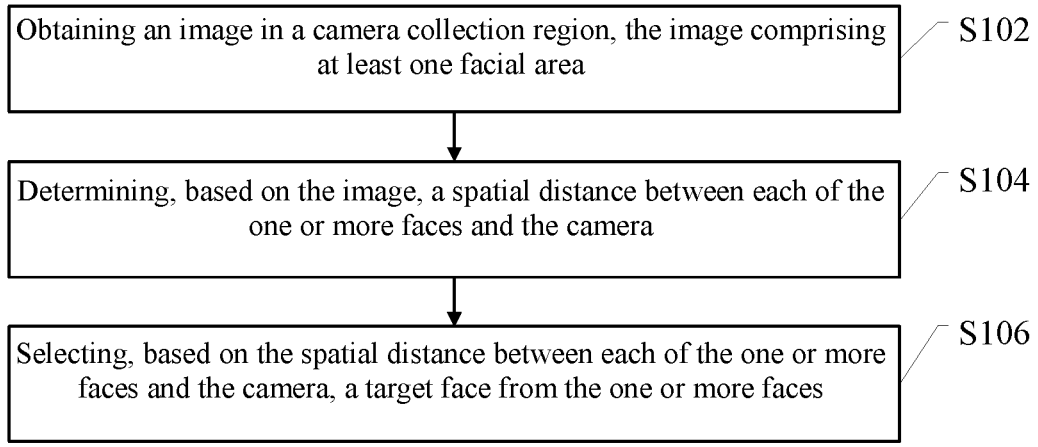
FIG. 1a is a schematic diagram illustrating a method for selecting a target face from one or more faces according to one embodiment of the present specification.

FIG. 1a is a schematic diagram illustrating a method for selecting a target face from one or more faces according to the embodiments of the present specification. The method may be performed by a camera device having image collection functions or a facial image processing apparatus having image collection functions, such as a device for face recognition and comparison, a payment terminal, or a self-service terminal.

In some embodiments, the method for selecting a target face from one or more faces according to the embodiments of the present specification may comprise the following steps:

S102: obtaining an image in a camera collection region, the image comprising one or more facial areas.

In some embodiments, an image to be obtained may be taken and detected by a camera, and the collection region herein may be determined according to the coverage of the camera—field-of-view (FOV). In some embodiments, the horizontal FOV is greater than the vertical FOV of the camera.

In some other embodiments, in the process of obtaining an image, the face detection technology with deep learning and the key point positioning technology with deep learning may be used to determine that the obtained image includes at least one facial area. In one embodiment, the face detection technology can include deep learning based on the model architecture of various neural networks. Key point positioning is a technique for locating facial areas, including eyebrows, eyes, nose, mouth, and face contours, which will not be elaborated in the embodiments of the present specification.

Considering that the camera's horizontal FOV is relatively larger than the vertical FOV of the camera, faces are not target faces for collection may be collected and may be detected and positioned in the image obtaining process. To this end, the faces can be further screened by reducing the FOV of the camera. In one embodiment, the method may further include:

Step 1, determining, based on the face detection technology with deep learning and the key point positioning technology with deep learning, one or more facial areas comprised in an original image shown in a camera collection region. The one or more facial areas in the original image are determined according to the original FOV of the camera.

Step 2, selecting at least one facial area in an effective collection region from the one or more facial areas. In some embodiments, the image in the camera collection region of the camera may include one or more facial areas. At least one facial area in the image corresponding to the effective collection region of the camera can be selected from the one or more facial areas. The effective collection region is a corresponding region of an image in a reduced FOV of the camera with respect to the original image. The reduced FOV is obtained after the original resolution of the camera is reduced to a predetermined ratio. In some embodiments, the effective collection region is a portion of the camera collection region and has a same corresponding relationship with the original camera collection region as the corresponding relationship between the image in the reduced FOV of the camera with the original image.

In this step, detection and positioning of facial areas at edges of the camera's viewing angle can be avoided by reducing the FOV. In some embodiments, the original resolution of the camera can be reduced to a predetermined ratio, that is, the FOV of the camera is reduced by enlarging the image and reducing the collection region. As such, at least one facial area in the effective collection region is selected from the one or more facial areas, thereby narrowing the selection of the target face.

In some other embodiments, the selection range of the predetermined ratio may be a ratio smaller than 1 and greater than 0. For example, the predetermined ratio may be 4/5 or 3/4, and the resolution of the camera can be reduced to 4/5 or 3/4 of the original resolution. In this way, the effective collection region may also be reduced to a corresponding region in the original image after the original resolution is reduced to the predetermined ratio. If the predetermined ratio is set to 0.999 or the like, there is not much difference between the effective collection region and the original collection region, resulting in little difference between the original collection region and the effective collection region. If the predetermined ratio is set to 0.001, the effective collection region is too small, and it may not be able to collect a facial area. Therefore, an appropriate range should be selected as the range of the predetermined ratio. For example, the range of the predetermined ratio may be between 1/4 and 9/10, between 3/4 and 4/5, or the like. The value range of the predetermined ratio is merely an example, which is not limited in the embodiments of the present specification.

S104: determining, a spatial distance between each of the one or more faces and the camera.

In some embodiments, the at least on facial area may include one or more faces. A spatial distance my include one or more dimension distances. In some embodiments, the spatial distance comprises at least one or any combination of the following: a depth-dimension distance formed by a projection of the distance between the face and the camera in a depth direction of the coordinate system; a horizontal-dimension distance formed by a projection of the distance between the face and the camera in a horizontal direction of the coordinate system, the horizontal direction being a direction of the vertical centerline of the imaging region of the camera; and a vertical-dimension distance formed by a projection of the distance between the face and the camera in a vertical direction of the coordinate system, the vertical direction being a direction of the horizontal centerline of the imaging region of the camera. A vertical centerline refers to a centerline dividing two parts of a plane in a vertical direction (above and below the centerline); a horizontal centerline refers to a centerline dividing two parts of a plane in a horizontal direction (left and right to the centerline).

Figure 1B:
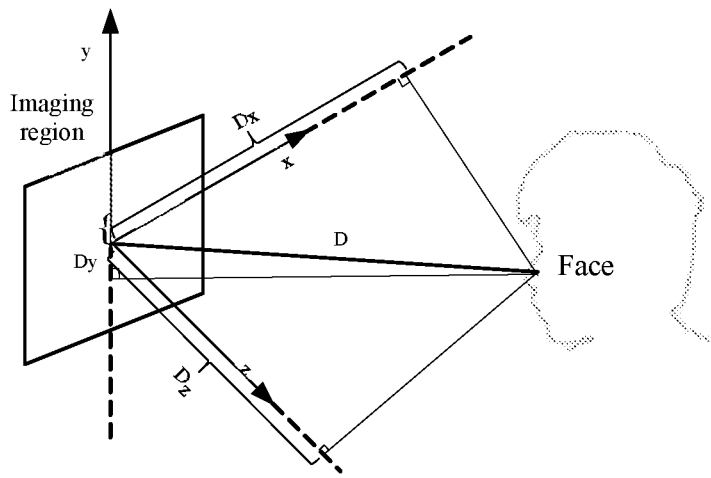
FIG. 1b is a 3D schematic diagram of a face and a camera according to one embodiment of the present specification.

FIG. 1b shows a three-dimensional (3D) diagram including the face and the camera. The illustrated imaging region of the camera may be viewed as a camera, and the camera and the face may construct the 3D coordinate system xyz shown in the figure. The horizontal direction is the x axis, the vertical direction is the y axis, and the depth direction is the z axis, all of which are mutually perpendicular. In addition, the x axis is the direction of the vertical centerline of the imaging region of the camera, the y axis is the direction of the horizontal centerline of the imaging region of the camera, and the z axis is the direction perpendicular to the imaging region of the camera. In some embodiments, the distance between the face and the camera is D. The depth-dimension distance in the spatial distance between the face and the camera is a distance Dz, which is a projection of the distance D in the z axis. Similarly, the horizontal-dimension distance in the spatial distance between the face and the camera is a distance Dx, which is a projection of the distance D in the x axis, and the vertical-dimension distance in the spatial distance between the face and the camera is a distance Dy, which is a projection of the distance D in the y axis.

In some other embodiments, the spatial distance set forth in the present specification may further comprise dimension distances in other dimensions, which is not limited in the embodiments of the present specification.

In some other embodiments, S104 may further comprise one or any combination of the following embodiments.

In Embodiment 1, the spatial distance comprises a depth-dimension distance. Based on positions of pixel points comprised in the face in the image, a camera alignment technique can used to calculate depth-dimension distances between the pixel points and the camera, respectively. The camera alignment technique may include hardware alignment or software alignment to ensure timing synchronization during detection. An average of the depth-dimension distances between the pixel points in the face and the camera is determined as the depth-dimension distance between the face and the camera. The depth-dimension distance determined in Embodiment 1 may be used to effectively evaluate the detected spatial distance between the face and the camera, which is more accurate than the solution that measures the facial area size.

In Embodiment 2, the spatial distance comprises a horizontal-dimension distance. Based on positions of pixel points comprised in the face in the image, horizontal-dimension distances between the pixel points and the camera are calculated, respectively. An average of the horizontal-dimension distances between the pixel points in the face and the camera is determined as the horizontal-dimension distance between the face and the camera. The horizontal-dimension distance set forth in the present specification not only includes a distance between the face and the vertical centerline of the imaging region of the camera, and may also include a distance between eyes of the face, or a distance between ears of the face. Although these are distances between symmetric organs of the face, they may essentially be understood as the distance between the individual organs in the symmetric organs and the vertical centerline of the imaging region of the camera.

In Embodiment 3, the spatial distance comprises a vertical-dimension distance. Based on positions of pixel points comprised in the face in the image, vertical-dimension distances between the pixel points and the camera are calculated, respectively. An average of the vertical-dimension distances between the pixel points in the face and the camera is determined as the vertical-dimension distance between the face and the camera.

The horizontal-dimension distance in Embodiment 2 and the vertical-dimension distance in Embodiment 3 can both be used to effectively evaluate the spatial distance between the face and the center position of the camera, which can, compared with the measurement of facial area size in current technologies, effectively avoid the issue of inaccurate detection due to relatively large face edges and improve the accuracy of selecting the target face.

The above three embodiments in Step S104 may occur independently or in any combination. For example, when the spatial distance comprises a depth-dimension distance but no other dimension distances, the steps in Embodiment 1 are performed in S104; when the spatial distance comprises a depth-dimension distance and a horizontal-dimension distance but no vertical-dimension distance, the steps in Embodiment 1 and 2 are performed in S104. It is not limited in the present specification whether the steps in Embodiment 1 and the steps in Embodiment 2 are performed separately or simultaneously. When the spatial distance comprises a depth-dimension distance, a horizontal-dimension distance, and a vertical-dimension distance, the steps in Embodiment 1, Embodiment 2 and Embodiment 3 are performed in S104, and it is not limited in the present specification whether the steps in Embodiment 1, 2 and 3 are performed separately or simultaneously.

S106: selecting, based on the spatial distance between each face of the one or more faces and the camera, a target face from the one or more faces.

Considering that types of dimension distances included in the spatial distance are different, different selection methods may be used. In the embodiments of the present specification, the following three types of selection methods may be used:

In some embodiments, a first selection method in S106 may include: sorting the one or more faces based on the spatial distance, and selecting a face having the smallest spatial distance from the one or more faces as the target face. For example, the spatial distance may be a depth-dimension distance, a horizontal-dimension distance, a vertical-dimension distance, or an actual distance, and each type of the dimension distances may be used independently as a screening condition for selecting a target face.

At least one facial area in the effective collection region is selected from the one or more facial areas by reducing the FOV of the camera, thereby narrowing the selection range of the target face. The use of any dimension distance in the spatial distance as a screening condition for selecting a target face further improves the efficiency of the target face selection, increases the accuracy, and avoids the errors caused by the selecting a target face based on facial area size.

Figure 2A:
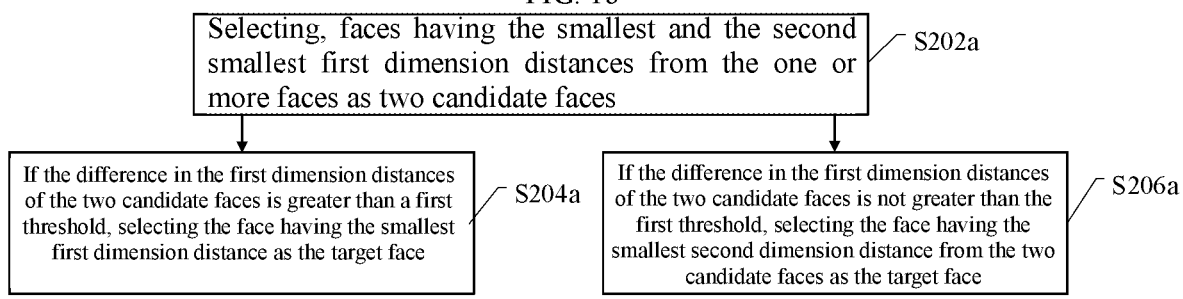
FIG. 2a is a schematic diagram illustrating a second selection method according to one embodiment of the present specification.

In some other embodiments, a second selection method in S106, as shown in FIG. 2a, may include: S202a: selecting, based on a first dimension distance between each of the one or more faces and the camera, faces having the smallest and the second smallest first dimension distances from the one or more faces as two candidate faces; S204a: if the absolute value of the difference in the first dimension distances of the two candidate faces is greater than a first threshold, selecting the face having the smallest first dimension distance from the two candidate faces as the target face; and S206a: if the absolute value of the difference in the first dimension distances of the two candidate faces is not greater than the first threshold, selecting, based on second dimension distances, the face having the smallest second dimension distance from the two candidate faces as the target face.

The first threshold may be a value obtained empirically or determined by corresponding algorithm. In some embodiments, the first threshold may be in a range of 150±50 mm, which is not limited in the present specification and may be set according to a selecting focal length of the camera's lens.

In yet other embodiments, S106 may also be performed in the following manner when the second selection method is implemented: selecting, based on the first dimension distance between each of the one or more faces and the camera, at least two candidate faces having the first dimension distances smaller than a fourth threshold from the one or more faces; and sorting the at least two candidate faces based on the second dimension distance, and selecting a face having the smallest second dimension distance from the at least two candidate faces as the target face.

In the second selection method, the spatial distance comprises a first dimension distance and a second dimension distance, and any two dimension distances may be combined as a screening condition for selecting a target face.

For example, the first dimension distance is a depth-dimension distance, and the second dimension distance is a horizontal-dimension distance; or the first dimension distance is a depth-dimension distance, and the second dimension distance is a vertical-dimension distance; or the first dimension distance is a horizontal-dimension distance, and the second dimension distance is a vertical-dimension distance; or the first dimension distance is a horizontal-dimension distance, and the second dimension distance is a depth-dimension distance; or the first dimension distance is a vertical-dimension distance, and the second dimension distance is a depth-dimension distance; or the first dimension distance is a vertical-dimension distance, and the second dimension distance is a horizontal-dimension distance.

At least one facial area in the effective collection region is screened and selected from the one or more facial areas by reducing the FOV of the camera, thereby narrowing the selection range of the target face. The use of any two dimension distances in the spatial distance as a screening condition for selecting a target face further improves the efficiency of target face selection, increases the accuracy, and avoids the errors caused by the selecting a target face based on facial area size.

Figure 2B:
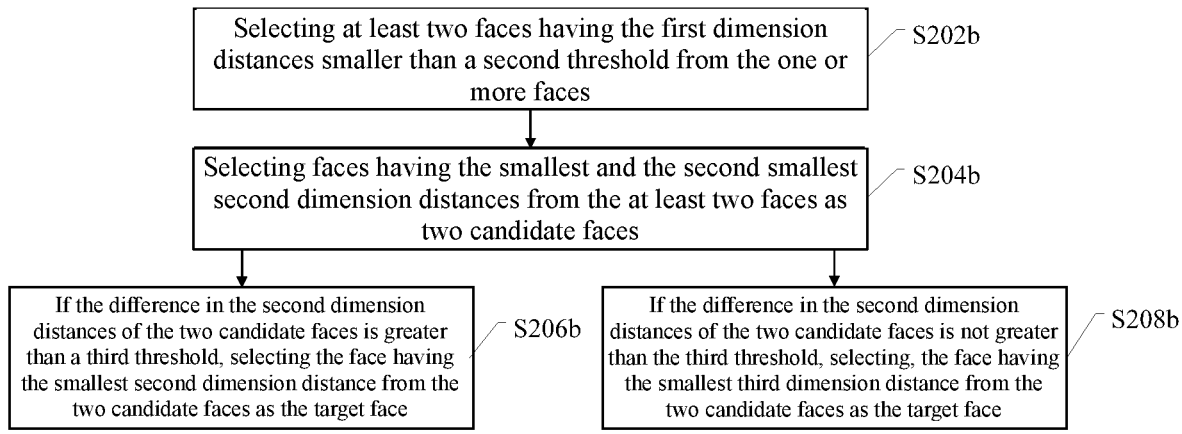
FIG. 2b is a schematic diagram illustrating a third selection method according to one embodiment of the present specification.

In still other embodiments, a third selection method in S106, as shown in FIG. 2b, may include: S202b: selecting, based on the first dimension distance between each of the one or more faces and the camera, at least two faces having the first dimension distances smaller than a second threshold from the one or more faces; S204b: selecting, based on the second dimension distances between the faces and the camera, faces having the smallest and the second smallest second dimension distances from the at least two faces as two candidate faces; S206b: if the difference in the second dimension distances of the two candidate faces is greater than a third threshold, selecting the face having the smallest second dimension distance from the two candidate faces as the target face; and S208b: if the difference in the second dimension distances of the two candidate faces is not greater than the third threshold, selecting, based on the third dimension distances, the face having the smallest third dimension distance from the two candidate faces as the target face.

In some other embodiments, S106 may also be performed in the following manner when the third selection method is implemented: selecting, based on the first dimension distance between each of the one or more faces and the camera, at least two faces having the first dimension distances smaller than the fourth threshold from the one or more faces; selecting, based on the second dimension distance between a face and the camera, at least two candidate faces having the second dimension distances smaller than a fifth threshold from the at least two faces; and sorting the at least two candidate faces based on the third dimension distance, and selecting a face having the smallest third dimension distance from the at least two candidate faces as the target face.

In the third selection method, the spatial distance comprises a first dimension distance, a second dimension distance, and a third dimension distance, and the three types of dimension distances may be freely combined as a screening condition for selecting a target face.

For example, the first dimension distance is a depth-dimension distance, the second dimension distance is a horizontal-dimension distance, and the third dimension distance is a vertical-dimension distance; or the first dimension distance is a depth-dimension distance, the second dimension distance is a vertical-dimension distance, and the third dimension distance is a horizontal-dimension distance; or the first dimension distance is a horizontal-dimension distance, the second dimension distance is a vertical-dimension distance, and the third dimension distance is a depth-dimension distance; or the first dimension distance is a horizontal-dimension distance, the second dimension distance is a depth-dimension distance, and the third dimension distance is a vertical-dimension distance; or the first dimension distance is a vertical-dimension distance, the second dimension distance is a horizontal-dimension distance, and the third dimension distance is a depth-dimension distance; or the first dimension distance is a vertical-dimension distance, the second dimension distance is a depth-dimension distance, and the third dimension distance is a horizontal-dimension distance.

In one embodiment, the one or more faces may comprise at least one of human faces and animal faces.

An example below is used to describe in detail the technical solutions of the present specification. This example is merely used to further clearly describe the technical solutions of the present specification, but not to impose limitations to the scope of the embodiments of the present specification.

Figure 3:
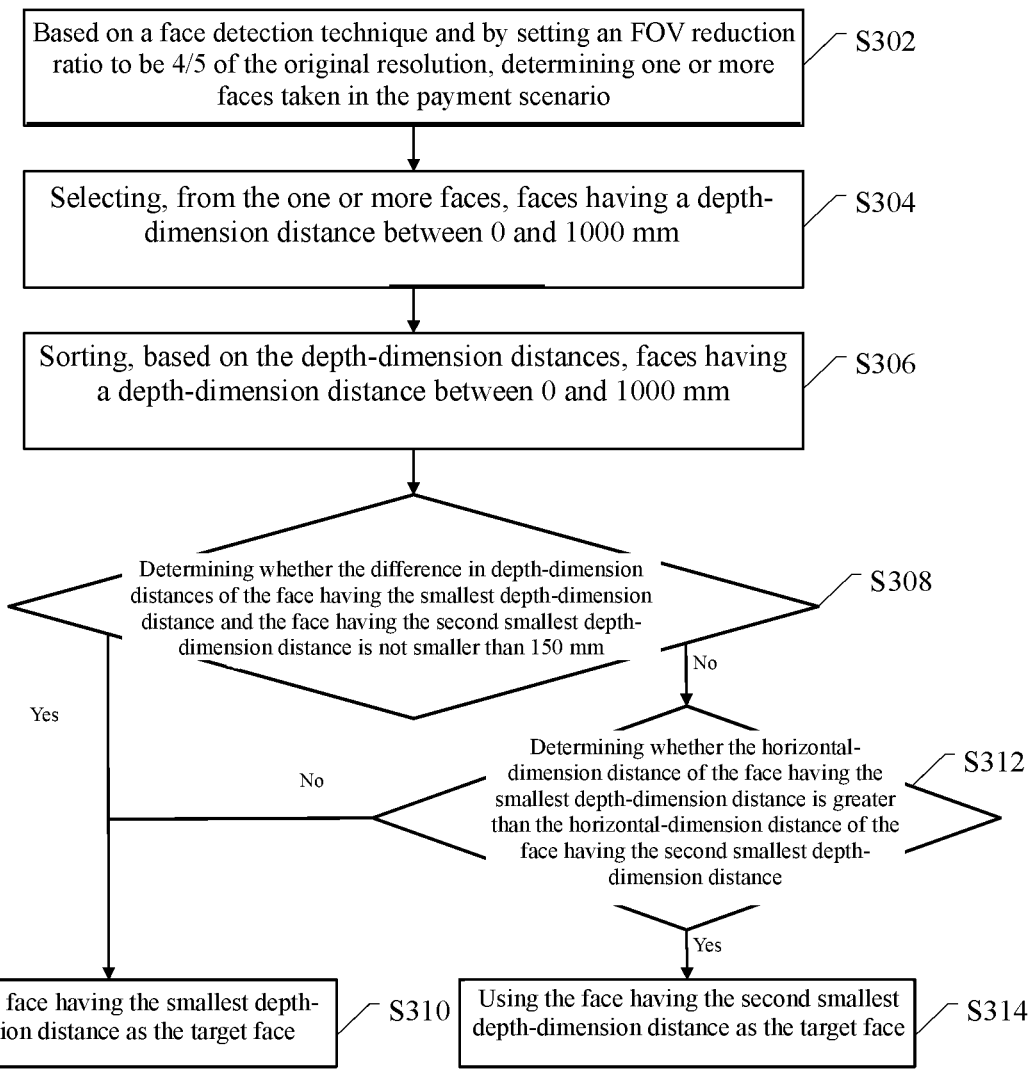
FIG. 3 is a schematic diagram illustrating a method for selecting a target face in a payment scenario according to one embodiment of the present specification.

Assuming that the combination of a depth-dimension distance and a horizontal-dimension distance in the spatial distance is used as a screening condition, and taking a payment scenario as an example, the method for selecting a target face may be implemented with reference to the following steps in FIG. 3.

S302: based on a face detection technique and by setting an FOV reduction ratio to be 4/5 of the original resolution, determining one or more faces taken in the payment scenario. Theses faces may be faces of people waiting in a line to make payments.

S304: selecting, from the one or more faces, faces having a depth-dimension distance between 0 and 1000 mm.

In another embodiment, the selection range of a target face be further narrowed by defining the range of the depth-dimension distance. For example, considering that the face with the shortest depth-dimension distance from the camera may be from payer that is making a face-scanning payment, the selection range may be further defined to be faces within a distance of 1 m from the payment terminal.

S306: sorting, based on the depth-dimension distances, faces having a depth-dimension distance between 0 and 1000 mm. Based on the sorting result, the smallest and the second smallest depth-dimension distances can be selected. In some embodiments, S306 can be omitted.

S308: determining whether the absolute value of the difference in depth-dimension distances of the face having the smallest depth-dimension distance and the face having the second smallest depth-dimension distance is not smaller than 150 mm; if yes, proceeding to execute S310; otherwise, proceeding to execute S312.

In an exemplary payment scenario, if the absolute value of the difference in depth-dimension distances of the face having the smallest depth-dimension distance from the camera and the face having the second smallest depth-dimension distance from the camera is not very large (which may be compared with a threshold), indicating that the two faces are very close to each other, or it is mistaken that the two faces are very close to each other due to the height difference between the payers. Then, either of the two faces may be a target face that is making the payment. S312 will be performed. If the absolute value of the difference between the two is large, it indicates that the two faces are far apart, and S310 may be performed.

S310: determining the face having the smallest depth-dimension distance as the target face. The face having the smallest depth-dimension distance from the camera may be considered as the target face of a payer that is making the payment.

S312: determining whether the horizontal-dimension distance of the face having the smallest depth-dimension distance is greater than the horizontal-dimension distance of the face having the second smallest depth-dimension distance; if yes, proceeding to execute S314; otherwise, redirecting to S310. In this step, further determination may be made according to the distance between the face and a centerline of the imaging region of the camera (which may be the horizontal-dimension distance here, e.g., the distance between eyes of a face), and the face having the smallest horizontal-dimension distance is selected as the target face.

S314: determining the face having the second smallest depth-dimension distance as the target face. The face having the second smallest depth-dimension distance is the face having the smallest horizontal-dimension distance.

With the above-described technical solution, in a payment scenario, a target face is selected, from one or more faces based on a spatial distance between each face of the one or more faces and the camera, thereby avoiding the errors caused by selecting the target face based on the facial area size, and improving the accuracy of selecting a target face. Moreover, considering that dimensions of spatial distance can be combined in any manner, the selection method can be flexibly set to improve the selection accuracy in a more reasonable and effective manner.

Embodiment II

Figure 4:
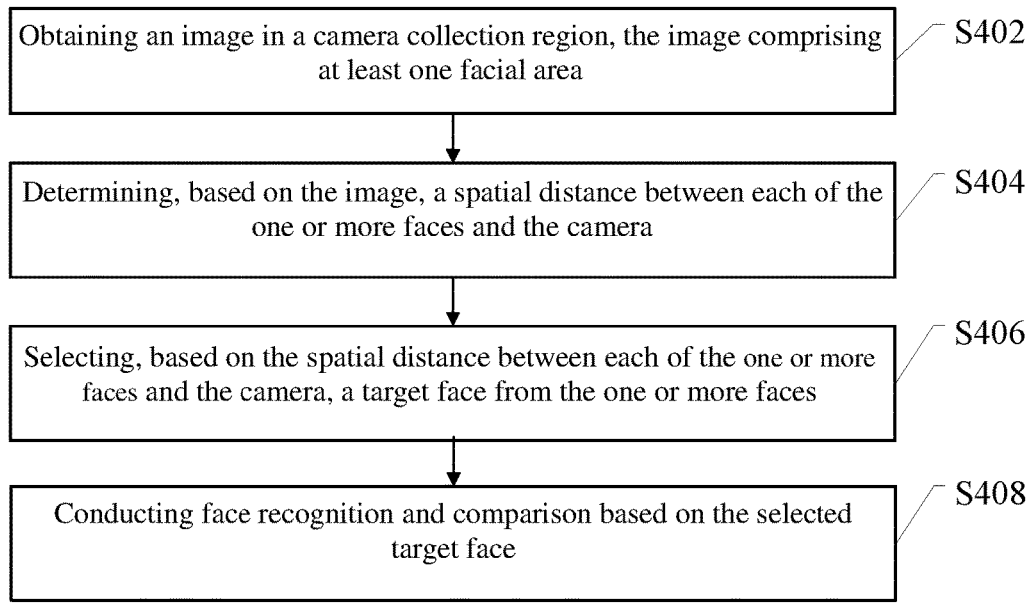
FIG. 4 is a schematic diagram illustrating a method for face recognition and comparison according to one embodiment of the present specification.

The embodiments of the present specification further provide a method for face recognition and comparison. Referring to FIG. 4, the method comprises: S402: obtaining an image in a camera collection region, the image comprising at least one facial area, which may include one or more faces; S404: determining, based on the image, a spatial distance between each of the one or more faces and the camera; S406: selecting, based on the spatial distance, a target face from the one or more faces; and S408: conducting face recognition and comparison based on the selected target face.

Relevant steps in Embodiment I may be referenced for the implementation of the steps S402-S406 in this method, which will not be elaborated in the embodiments of the present specification.

With the above-described technical solution, a target face may be selected, based on a spatial distance between each of the one or more faces and a camera, from the one or more faces, and face recognition and comparison may be conducted based on the target face. Therefore, the defect caused by the selecting a target face based on facial area size can be avoided, and the accuracy of selecting a target face and the accuracy of face recognition and comparison are improved.

Embodiment III

Figure 5:
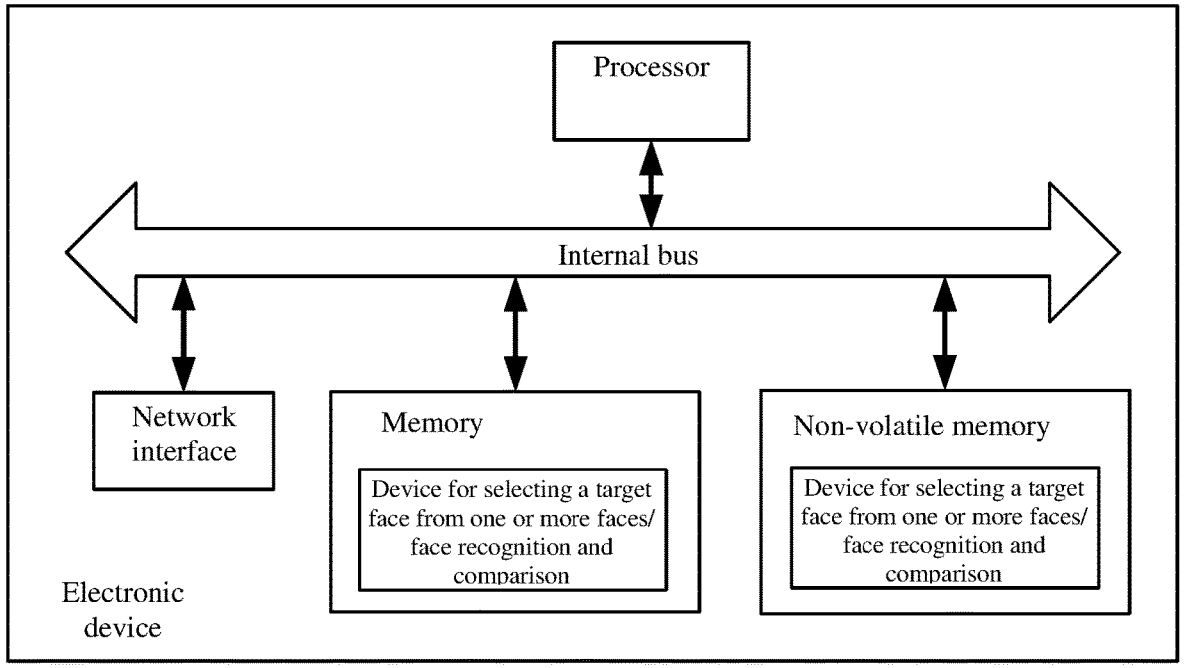
FIG. 5 is a schematic structural diagram of an electronic device according to one embodiment of the present specification.

FIG. 5 is a schematic structural diagram of an electronic device according to one embodiment of the present specification. Referring to FIG. 5, on the hardware level, the electronic device comprises a processor and optionally further comprises an internal bus, a network interface, and a memory. The memory may include an internal memory, such as Random-Access Memory (RAM), and may include a non-volatile memory, such as at least one magnetic memory. The electronic device may also include hardware required by other transactions.

The processor, the network interface, and the memory may be connected to each other via the internal bus. The internal bus may be an Industry Standard Architecture (ISA) bus, a Peripheral Component Interconnect (PCI) bus, or an Extended Industry Standard Architecture (EISA) bus. The bus may be divided into address bus, data bus, control bus, and the like. For ease of illustration, the bus is represented only by a two-way arrow in FIG. 5, which does not mean that there is only one bus or one type of buses.

The memory is used to store programs. For example, the program may include program code, and the program code includes computer operation instructions. The memory may include an internal memory and a non-volatile memory, and provide instructions and data to the processor.

The processor reads a corresponding computer program from the non-volatile memory into the internal memory and runs the computer program to form a shared resource access control device on the logic level. The processor executes the programs stored in the memory and is configured to execute the following operations: obtaining an image in a camera collection region, the image comprising at least one facial area; determining, based on the image, a spatial distance between each of the one or more faces and the camera; and selecting, based on the spatial distance between each of the one or more faces and the camera, a target face from the one or more faces.

In another embodiment, the operations may include: obtaining an image in a camera collection region, the image comprising at least one facial area, the at least one facial area including one or more faces; determining, based on the image, a spatial distance between each of the one or more faces and the camera; selecting, based on the spatial distance, a target face from the one or more faces; and conducting face recognition and comparison based on the selected target face.

The above-described method for selecting a target face from one or more faces and method for face recognition and comparison disclosed in the embodiments shown in FIG. 1a to FIG. 4 of the present specification may be applied to a processor or may be implemented by a processor. The processor may be an integrated circuit chip and is capable of signal processing. In an implementation process, the steps of the above-described methods may be completed through a hardware integrated logic circuit or instructions in the form of software in the processor. The processor may be a general processor, including Central Processing Unit (CPU), Network Processor (NP), and the like, or may be a Digital Signal Processor (DSP), an Application Specific Integrated Circuit (ASIC), a Field—Programmable Gate Array (FPGA) or other programmable logic devices, a discrete gate or transistor logic device, a discrete hardware component, etc., which may implement or execute all methods, steps, and logic block diagrams disclosed in the embodiments of the present specification. The general processor may be a microprocessor or may be any convention processor. The steps of the methods disclosed in the embodiments of the present specification, the processor may be directly executed by a hardware decoding processor or by a combination of hardware and software modules in the decoding processor. The software modules may be disposed in a mature storage medium in the art, such as a RAM, a flash memory, a read-only memory, a programmable read only memory or an electrically erasable programmable read only memory, a register, and the like. The storage medium is disposed in the memory, and the processor reads information in the memory and completes steps of the above methods in combination with the hardware thereof.

This electronic device may further execute the method shown in FIG. 1a, perform functions of the device for selecting a target face from one or more faces in the embodiments shown in FIG. 1a through FIG. 3, and perform functions of the device for face recognition and comparison in the embodiment shown in FIG. 4, which will not be elaborated in the embodiments of the present specification.

In addition to the software implementation manner, the electronic device in the embodiments of the present specification does not exclude other implementation manners, such as a logic device or a combination of software and hardware. In other words, the processing flow below may be performed not only by logic units, but also by hardware or logic devices.

With the above-described technical solution, a target face is selected, from one or more faces based on a spatial distance between each of the one or more faces and the camera, thereby avoiding the errors caused by selecting the target face based on the facial area size, and improving the accuracy of selecting a target face. Moreover, considering that dimensions of spatial distance can be combined in any manner, the selection method can be flexibly set to improve the selection accuracy in a more reasonable and effective manner.

Embodiment IV

The embodiments of the present specification further provide a computer readable storage medium, wherein the computer readable storage medium stores one or more programs, the one or more programs comprise instructions, and when executed by a portable electronic device comprising a plurality of applications, the instructions can cause the portable electronic device to execute the method in the embodiment shown in FIG. 1a, and specifically to execute the following method: obtaining an image in a camera collection region, the image comprising at least one facial area; determining, based on the image, a spatial distance between each of the one or more faces and the camera; and selecting, based on the spatial distance between each of the one or more faces and the camera, a target face from the one or more faces.

The embodiments of the present specification further provide a computer readable storage medium, wherein the computer readable storage medium stores one or more programs, the one or more programs comprise instructions, and when executed by a portable electronic device comprising a plurality of applications, the instructions can cause the portable electronic device to execute the method in the embodiment shown in FIG. 4, and specifically to execute the following method: obtaining an image in a camera collection region, the image comprising at least one facial area, the at least one facial area including one or more faces; determining, based on the image, a spatial distance between each of the one or more faces and the camera; selecting, based on the spatial distance between each of the one or more faces and the camera, a target face from the one or more faces; and conducting face recognition and comparison based on the selected target face.

With the above-described technical solution, a target face is selected, from one or more faces based on a spatial distance between each of the one or more faces and the camera, thereby avoiding the errors caused by selecting the target face based on the facial area size, and improving the accuracy of selecting a target face. Moreover, considering that dimensions of spatial distance can be combined in any manner, the selection method can be flexibly set to improve the selection accuracy in a more reasonable and effective manner.

Embodiment V

Figure 6:
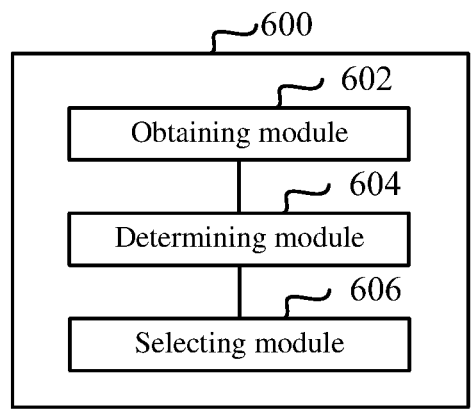
FIG. 6 is a schematic structural diagram of a device for selecting a target face from one or more faces according to one embodiment of the present specification.

FIG. 6 is a schematic structural diagram of a device 600 for selecting a target face from one or more faces according to one embodiment of the present specification. Referring to FIG. 6, in a software implementation manner, the device 600 for selecting a target face from one or more faces may comprise: an obtaining module 602 configured to obtain an image in a camera collection region, the image comprising at least one facial area, the at least one facial area including one or more faces; a determining module 604 configured to determine, based on the image, a spatial distance between each of the one or more faces and the camera; and a selecting module 606 configured to select, based on the spatial distance, a target face from the one or more faces.

With the above-described technical solution, a target face may be selected, based on a spatial distance between each of the one or more faces and a camera, from the one or more faces. Therefore, the errors caused by the selecting a target face based on facial area size can be avoided, and the accuracy of selecting a target face is improved. Moreover, considering that dimensions of spatial distance can be combined in any manner, the selection method can be flexibly set to improve the selection accuracy in a more reasonable and effective manner.

In some embodiments, the obtaining module 602 is further configured to determine, based on face detection technology with deep learning and key point positioning technology with deep learning deep learning, one or more facial areas comprised in an image in the camera collection region; and screen to select at least one facial area in an effective collection region from the one or more facial areas. The effective collection region is a portion of the camera collection region and has a same corresponding relationship with the camera collection region as the corresponding relationship between an image in a reduced FOV of the camera with the image. The reduced FOV of the camera is obtained after an original resolution of the camera is reduced by a predetermined ratio.

The selection range of predetermined ratio may be a ratio smaller than 1 and greater than 0. For example, the predetermined ratio may be 4/5 or 3/4, and the resolution of the camera can be reduced to 4/5 or 3/4 of the original resolution. As such, the effective collection region may also be reduced to a corresponding region, in the original image, of an image collected after the original resolution is reduced to the predetermined ratio. If the predetermined ratio is set to 0.999 or the like, there is not much difference between the effective collection region and the corresponding region, resulting in little difference between the original collection region and the effective collection region. If the predetermined ratio is set to 0.001, the effective collection region is too small to collect a facial area. Therefore, an appropriate range should be selected as the range of the predetermined ratio. For example, the range of the predetermined ratio may be between 1/4 and 9/10, between 3/4 and 4/5, or the like. The value ranges of the predetermined ratio are merely an example, which is not limited in the embodiments of the present specification.

In some embodiments, the spatial distance at least comprises one or any combination of the following: a depth-dimension distance formed by a projection of the distance between the face and the camera in a depth direction of the coordinate system; a horizontal-dimension distance formed by a projection of the distance between the face and the camera in a horizontal direction of the coordinate system, the horizontal direction being a direction of the vertical centerline of the imaging region of the camera; and a vertical-dimension distance formed by a projection of the distance between the face and the camera in a vertical direction of the coordinate system, the vertical direction being a direction of the horizontal centerline of the imaging region of the camera.

In some other embodiments, the determining module 604 may be configured to, in one or any combination of the following situations, when the spatial distance comprises a depth-dimension distance, use a camera alignment technique to calculate, based on positions of pixel points comprised in the face in the image, depth-dimension distances between the pixel points and the camera, respectively; take an average of the depth-dimension distances between the pixel points in the face and the camera, and determine the average as the depth-dimension distance between the face and the camera. When the spatial distance comprises a horizontal-dimension distance, calculate, based on positions of pixel points comprised in the face in the image, horizontal-dimension distances between the pixel points and the camera, respectively; take an average of the horizontal-dimension distances between the pixel points in the face and the camera, and determine the average as the horizontal-dimension distance between the face and the camera. When the spatial distance comprises a vertical-dimension distance, calculate, based on positions of pixel points comprised in the face in the image, vertical-dimension distances between the pixel points and the camera, respectively; and take an average of the vertical-dimension distances between the pixel points in the face and the camera, and determine the average as the vertical-dimension distance between the face and the camera.

In one embodiment, the selecting module 606 is configured to sort the one or more faces based on the spatial distance, and select a face having the smallest spatial distance from the one or more faces as the target face.

In another embodiment, the spatial distance comprises a first dimension distance and a second dimension distance; and the selecting module 606 is specifically configured to select, based on the first dimension distance between each of the one or more faces and the camera, faces having the smallest and the second smallest first dimension distances from the one or more faces as two candidate faces; if the absolute value of the difference in the first dimension distances of the two candidate faces is greater than a first threshold, select the face having the smallest first dimension distance from the two candidate faces as the target face; and if the absolute value of the difference in the first dimension distances of the two candidate faces is not greater than a first threshold, select, based on the second dimension distance, the face having the smallest second dimension distance from the two candidate faces as the target face.

In still another embodiment, the spatial distance comprises a first dimension distance, a second dimension distance, and a third dimension distance; and the selecting module 606 is configured to select, based on the first dimension distance between each of the one or more faces and the camera, at least two faces having the first dimension distances smaller than a second threshold from the one or more faces; select, based on the second dimension distances between the faces and the camera, faces having the smallest and the second smallest second dimension distances from the at least two faces as two candidate faces; if the difference in the second dimension distances of the two candidate faces is greater than a third threshold, select the face having the smallest second dimension distance from the two candidate faces as the target face; and otherwise, select, based on the third dimension distances, the face having the smallest third dimension distance from the two candidate faces as the target face.

In yet another embodiment, the face comprises at least one of human faces and animal faces.

The device for selecting a target face from one or more faces in the embodiments of the present specification may further execute the methods shown in FIG. 1a through FIG. 3, which will not be elaborated in the embodiments of the present specification.

Figure 7:
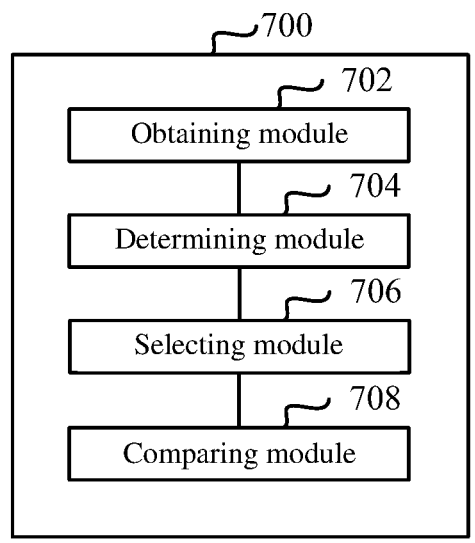
FIG. 7 is a schematic structural diagram of a device for face recognition and comparison according to one embodiment of the present specification.

FIG. 7 is a schematic structural diagram of a device 700 for face recognition and comparison according to one embodiment of the present specification. Referring to FIG. 7, in a software implementation manner, the device 700 for face recognition and comparison may comprise: an obtaining module 702 configured to obtain an image in a camera collection region, the image comprising at least one facial area; a determining module 704 configured to determine, based on the image, a spatial distance between each of the one or more faces and the camera; a selecting module 706 configured to select, based on the spatial distance between each of the one or more faces and the camera, a target face from the one or more faces; and a comparing module 708 configured to conduct face recognition and comparison based on the selected target face.

In summary, the above-described are exemplary embodiments of the present specification, which are not used to limit the protection scope of the present specification. Any modification, equivalent substitution, or improvement made within the spirit and principle of the present specification shall be encompassed by the protection scope of the present specification.

The systems, apparatuses, modules or units illustrated in the foregoing embodiments may be achieved by computer chips or entities, or by products with certain functions. A typical achievement device is a computer. An exemplary form of the computer may be a personal computer, a laptop computer, a cell phone, a camera phone, a smart phone, a personal digital assistant, a media player, a navigation device, an email device, a game console, a tablet computer, a wearable device or any combination of these devices.

Computer readable media include non-volatile and volatile, movable and non-movable media and may achieve information storage by any method or technology. Information may be computer readable instructions, data structures, program modules or other data. Examples of computer storage media include, but are not limited to, phase change random access memory (PRAM), static random access memory (SRAM), dynamic random access memory (DRAM), other types of random access memory (RAM), read only memory (ROM), electrically erasable programmable read only memory (EEPROM), flash memory or other memory technologies, compact disc-read only memory (CD-ROM), digital versatile disc (DVD) or other optical memory, cassette type magnetic tape, magnetic disk memory or other magnetic storage devices, or any other non-transfer media, which may be used to store information that is accessible to computing devices. According to the definition in this document, computer readable media do not include transitory media, such as modulated data signals and carriers.

It should be further noted that the terms of "including," "comprising," or any other variants thereof are intended to encompass a non-exclusive inclusion, such that a process, method, product, or device comprising a series of elements not only comprises these elements, but also comprises other elements that are not clearly listed, or further comprises elements that are inherent to the process, method, product, or device. When there is no further screening, elements defined by the statement "comprising one . . . " do not exclude that a process, method, product, or device comprising the above elements further comprises additional identical elements.

The embodiments in the present specification are described in a progressive manner with each embodiment focused on differences from other embodiments, and the embodiments may be mutually referenced for identical or similar parts. In particular, the system embodiment is described in a relatively simple manner, as it is substantially similar to the method embodiment. The description of the method embodiment may be referenced for the related parts.

What is claimed is:

1. A method for selecting a target face, comprising:
obtaining at least one facial area including one or more faces in an image taken by a camera by:
determining one or more facial areas comprised in the image in a camera collection region of the camera; and
selecting the at least one facial area in the image corresponding to an effective collection region of the camera from the one or more facial areas, wherein the effective collection region is a portion of the camera collection region and has a same corresponding relationship with the camera collection region as a corresponding relationship between an image in a reduced field of view of the camera with the image, the reduced field of view of the camera being obtained after an original resolution of the camera is reduced by a predetermined ratio;
determining, based on the image, a spatial distance between each of the one or more faces and the camera; and
selecting, based on the spatial distance, the target face from the one or more faces.

2. The method according to claim 1, wherein the spatial distance comprises at least one or any combination of the following:
a depth-dimension distance formed by a first projection of a distance between the face and the camera in a depth direction of a coordinate system, the depth direction being a first direction perpendicular to an imaging region of the camera;
a horizontal-dimension distance formed by a second projection of the distance between the face and the camera in a horizontal direction of the coordinate system, the horizontal direction being a second direction in which a vertical centerline of the imaging region of the camera is; and
a vertical-dimension distance formed by a third projection of the distance between the face and the camera in a vertical direction of the coordinate system, the vertical direction being a third direction in which a horizontal centerline of the imaging region of the camera is.

3. The method according to claim 2, wherein the determining a spatial distance between each of the one or more faces and the camera comprises one or any combination of the following:
when the spatial distance comprises the depth-dimension distance, calculating, based on positions of pixel points comprised in the face, depth-dimension distances between the pixel points and the camera, respectively, and determining a first average of the depth-dimension distances as the depth-dimension distance between the face and the camera;
when the spatial distance comprises the horizontal-dimension distance, calculating, based on the positions of the pixel points comprised in the face, horizontal-dimension distances between the pixel points and the camera, respectively, and determining a second average of the horizontal-dimension distances as the horizontal-dimension distance between the face and the camera; and
when the spatial distance comprises a vertical-dimension distance, calculating, based on the positions of the pixel points comprised in the face, vertical-dimension distances between the pixel points and the camera, respectively, and determining a third average of the vertical-dimension distances as the vertical-dimension distance between the face and the camera.

4. The method according to claim 1, wherein the selecting, based on the spatial distance, the target face from the one or more faces comprises:
selecting a face having the smallest spatial distance from the one or more faces as the target face.

5. The method according to claim 1, wherein the spatial distance comprises a first dimension distance and a second dimension distance; and the selecting, based on the spatial distance, the target face from the one or more faces comprises:
selecting faces having the smallest and the second smallest first dimension distances from the one or more faces as two candidate faces;
determining a difference in the first dimension distances of the two candidate faces;
in response to the difference being greater than a first threshold, selecting the face having the smallest first dimension distance from the two candidate faces as the target face; and
in response to the difference being not greater than the first threshold, selecting a face having the smallest second dimension distance from the two candidate faces as the target face.

6. The method according to claim 1, wherein the spatial distance comprises a first dimension distance, a second dimension distance, and a third dimension distance; and the selecting, based on the spatial distance, the target face from the one or more faces comprises:
selecting at least two faces having the first dimension distances smaller than a second threshold from the one or more faces;
selecting, faces having the smallest and the second smallest second dimension distances from the at least two faces as two candidate faces;

determining a difference in the second dimension distances of the two candidate faces;
in response to the difference being greater than a third threshold, selecting the face having the smallest second dimension distance from the two candidate faces as the target face; and
in response to the difference being not greater than the third threshold, selecting, based on the third dimension distances, a face having the smallest third dimension distance from the two candidate faces as the target face.

7. The method according to claim 1, further comprising: performing face recognition and comparison based on the selected target face.

8. A device for selecting a target face, comprising one or more processors and one or more non-transitory computer-readable memories coupled to the one or more processors and configured with instructions executable by the one or more processors to perform operations comprising:
obtaining at least one facial area including one or more faces in an image taken by a camera by:
determining one or more facial areas comprised in the image in a camera collection region of the camera; and
selecting the at least one facial area in the image corresponding to an effective collection region of the camera from the one or more facial areas, wherein the effective collection region is a portion of the camera collection region and has a same corresponding relationship with the camera collection region as a corresponding relationship between an image in a reduced field of view of the camera with the image, the reduced field of view of the camera being obtained after an original resolution of the camera is reduced by a predetermined ratio;
determining, based on the image, a spatial distance between each of the one or more faces and the camera; and
selecting, based on the spatial distance, the target face from the one or more faces.

9. The device according to claim 8, wherein the spatial distance comprises at least one or any combination of the following:
a depth-dimension distance formed by a first projection of a distance between the face and the camera in a depth direction of a coordinate system, the depth direction being a first direction perpendicular to an imaging region of the camera;
a horizontal-dimension distance formed by a second projection of the distance between the face and the camera in a horizontal direction of the coordinate system, the horizontal direction being a second direction in which a vertical centerline of the imaging region of the camera is; and
a vertical-dimension distance formed by a third projection of the distance between the face and the camera in a vertical direction of the coordinate system, the vertical direction being a third direction in which a horizontal centerline of the imaging region of the camera is.

10. The device according to claim 9, wherein the determining a spatial distance between each of the one or more faces and the camera comprises one or any combination of the following:
when the spatial distance comprises the depth-dimension distance, calculating, based on positions of pixel points comprised in the face, depth-dimension distances between the pixel points and the camera, respectively, and determining a first average of the depth-dimension distances as the depth-dimension distance between the face and the camera;
when the spatial distance comprises the horizontal-dimension distance, calculating, based on the positions of the pixel points comprised in the face, horizontal-dimension distances between the pixel points and the camera, respectively, and determining a second average of the horizontal-dimension distances as the horizontal-dimension distance between the face and the camera; and
when the spatial distance comprises a vertical-dimension distance, calculating, based on the positions of the pixel points comprised in the face, vertical-dimension distances between the pixel points and the camera, respectively, and determining a third average of the vertical-dimension distances as the vertical-dimension distance between the face and the camera.

11. The device according to claim 8, wherein the selecting, based on the spatial distance, the target face from the one or more faces comprises:
sorting the one or more faces based on the spatial distance; and
selecting a face having the smallest spatial distance from the one or more faces as the target face.

12. The device according to claim 8, wherein the spatial distance comprises a first dimension distance and a second dimension distance; and the selecting, based on the spatial distance, the target face from the one or more faces comprises:
selecting faces having the smallest and the second smallest first dimension distances from the one or more faces as two candidate faces;
determining a difference in the first dimension distances of the two candidate faces;
in response to the difference being greater than a first threshold, selecting the face having the smallest first dimension distance from the two candidate faces as the target face; and
in response to the difference being not greater than the first threshold, selecting a face having the smallest second dimension distance from the two candidate faces as the target face.

13. The device according to claim 8, wherein the spatial distance comprises a first dimension distance, a second dimension distance, and a third dimension distance; and the selecting, based on the spatial distance, the target face from the one or more faces comprises:
selecting at least two faces having the first dimension distances smaller than a second threshold from the one or more faces;
selecting, faces having the smallest and the second smallest second dimension distances from the at least two faces as two candidate faces;
determining a difference in the second dimension distances of the two candidate faces;
in response to the difference being greater than a third threshold, selecting the face having the smallest second dimension distance from the two candidate faces as the target face; and
in response to the difference being not greater than the third threshold, selecting, based on the third dimension distances, a face having the smallest third dimension distance from the two candidate faces as the target face.

14. The device according to claim 8, wherein the operations further comprise: performing face recognition and comparison based on the selected target face.

15. A non-transitory computer-readable storage medium for selecting a target face, storing instructions executable by one or more processors to cause the one or more processors to perform operations comprising:
   obtaining at least one facial area including one or more faces in an image taken by a camera by:
      determining one or more facial areas comprised in the image in a camera collection region of the camera; and
      selecting the at least one facial area in the image corresponding to an effective collection region of the camera from the one or more facial areas, wherein the effective collection region is a portion of the camera collection region and has a same corresponding relationship with the camera collection region as a corresponding relationship between an image in a reduced field of view of the camera with the image, the reduced field of view of the camera being obtained after an original resolution of the camera is reduced by a predetermined ratio;
   determining, based on the image, a spatial distance between each of the one or more faces and the camera; and
   selecting, based on the spatial distance, the target face from the one or more faces.

16. The non-transitory computer-readable storage medium according to claim 15, wherein the selecting, based on the spatial distance, the target face from the one or more faces comprises:
   selecting a face having the smallest spatial distance from the one or more faces as the target face.

17. The non-transitory computer-readable storage medium according to claim 15, wherein the spatial distance comprises a first dimension distance and a second dimension distance; and the selecting, based on the spatial distance, the target face from the one or more faces comprises:
   selecting faces having the smallest and the second smallest first dimension distances from the one or more faces as two candidate faces;
   determining a difference in the first dimension distances of the two candidate faces;
   in response to the difference being greater than a first threshold, selecting the face having the smallest first dimension distance from the two candidate faces as the target face; and
   in response to the difference being not greater than the first threshold, selecting a face having the smallest second dimension distance from the two candidate faces as the target face.

18. The non-transitory computer-readable storage medium according to claim 15, wherein the spatial distance comprises a first dimension distance, a second dimension distance, and a third dimension distance; and the selecting, based on the spatial distance, a target face from the one or more faces comprises:
   selecting at least two faces having the first dimension distances smaller than a second threshold from the one or more faces;
   selecting, faces having the smallest and the second smallest second dimension distances from the at least two faces as two candidate faces;
   determining a difference in the second dimension distances of the two candidate faces;
   in response to the difference being greater than a third threshold, selecting the face having the smallest second dimension distance from the two candidate faces as the target face; and
   in response to the difference being not greater than the third threshold, selecting, based on the third dimension distances, a face having the smallest third dimension distance from the two candidate faces as the target face.

19. A method for selecting a target face, comprising:
   obtaining at least one facial area including one or more faces in an image taken by a camera;
   determining, based on the image, a spatial distance between each of the one or more faces and the camera; and
   selecting, based on the spatial distance, the target face from the one or more faces, wherein the spatial distance comprises at least one or any combination of the following:
   a depth-dimension distance formed by a first projection of a distance between the face and the camera in a depth direction of a coordinate system, the depth direction being a first direction perpendicular to an imaging region of the camera;
   a horizontal-dimension distance formed by a second projection of the distance between the face and the camera in a horizontal direction of the coordinate system, the horizontal direction being a second direction in which a vertical centerline of the imaging region of the camera is; and
   a vertical-dimension distance formed by a third projection of the distance between the face and the camera in a vertical direction of the coordinate system, the vertical direction being a third direction in which a horizontal centerline of the imaging region of the camera is.

* * * * *